United States Patent [19]

Hodgkinson et al.

[11] Patent Number: 6,163,807
[45] Date of Patent: Dec. 19, 2000

[54] PACKET NETWORK

[75] Inventors: Terence G Hodgkinson; Simon F Carter, both of Woodbridge; Alan William O'Neill, Ipswich; Paul Patrick White, Swinton, all of United Kingdom

[73] Assignee: British Telecommunications public limited company, London, United Kingdom

[21] Appl. No.: 09/202,073

[22] PCT Filed: Nov. 3, 1998

[86] PCT No.: PCT/GB98/03274

§ 371 Date: Dec. 7, 1998

§ 102(e) Date: Dec. 7, 1998

[87] PCT Pub. No.: WO99/23799

PCT Pub. Date: May 14, 1999

[30] Foreign Application Priority Data

Nov. 3, 1997 [EP] European Pat. Off. .............. 97308790

[51] Int. Cl.[7] ..................................................... G06F 13/00
[52] U.S. Cl. .......................... 709/229; 709/230; 709/238; 370/443
[58] Field of Search ...................................... 709/220, 223, 709/226, 230, 238, 229; 370/431, 437, 439, 443, 457, 462

[56] References Cited

U.S. PATENT DOCUMENTS

| | | | |
|---|---|---|---|
| 5,831,975 | 11/1998 | Chen et al. | 370/256 |
| 5,841,777 | 11/1998 | Cohen | 370/443 |
| 6,038,212 | 3/2000 | Galand et al. | 370/216 |

OTHER PUBLICATIONS

Werner Almesberger et al., 'Scalable Resource Reservation for the Internet', Technical Report 97/234, Jun. 1997.
J. M. Pullen et al., 'Limitations of Internet Protocol Suite for Distributed Simulation in the Large Multicast Environment', Internet–Draft, Mar. 1997.
Steve Seidensticker et al., 'Scenarios and Appropriate Protocols for Distributed Interactive Simulation', Internet–Draft, Mar. 1997.
T. Billhartz, J. B. Cain, E. Farrey–Goudreau, D. Fieg, S. Batsell, and S. Milner, 'Performance and Resource Cost Comparisons for the CBT and PIM Multicast Routing Protocols in DIS Environments', invited paper submitted to IEEE Journal on Selected Areas in Communications submitted Dec. 1995.
K. Carlberg and J. Crowcroft, "Building shared trees using a one–to–many joining mechanism," ACM Computer Communication Review, vol. 27, pp. 5–11, Jan. 1997.
R. Braden, Ed., L. Zhang et al., 'Resource ReSerVation Protocol (RSVP)–Version 1.0 Functional Specification', RFC2205, Sep. 1997.
P. Newman et al., 'Iposilon Flow Management Protocol Specification for IPv4 Version 1.0', RFC 1953, May 1996.
S. Shenker et al., 'Specification of Guaranteed Quality of Service', RFC 2212, Sep. 1997.
P. White, 'RSVP and Integrated Services in the Internet: a tutorial', IEEE Communications magazine, May 1997.
J. Wroclawski, 'Specification of the Controlled–Load Network Element Service', RFC 2211, Sep. 1997.

(List continued on next page.)

*Primary Examiner*—Viet D. Vu
*Attorney, Agent, or Firm*—Nixon & Vanderhye P.C.

[57] ABSTRACT

A method of reserving resources in an internet is disclosed. The method provides an improved process for use in relation to large scale shared-tree multicast environments since its use results in a reduction in path state in the routers (A–E, R1–R6) in the internet. The method involves the sending of path characteristics upstream from receivers (H1–H7) to senders (H1–H7), the routers in between combining path characteristics from different sources downstream of them. Reservations are subsequently made on the basis of the combined path characteristic data, the nature of the sender's traffic and the end-to-end quality of service required by the sender.

7 Claims, 3 Drawing Sheets

OTHER PUBLICATIONS

Integrated Services (intserv) Charter as at 38$^{th}$ IETF meeting in Memphis, Tennessee, Apr. 1997.

C. Topolcic, 'Experimental Internet Stream Protocol, Version 2 (ST–II)', rfc 1190, Oct. 1990.

Integrated Services over Specific Link Layers (issll) Charter as at 38$^{th}$ IETF meeting in Memphis, Tenessee, Apr. 1997.

Ping Pan et al., 'YESSIR: A Simple Reservation Mechanism for the Internet', IBM Technical Report 20697.

"On Hop–by–Hop Rate–Based Congestion Control", Partho Pratim Mishra et al., IEEE/ACM Trans. on Networking 4 Apr., (1996) No. 2.

"Two Issues in Reservation Establishment", Scott Shenker et al., Computer Communications Review, vol. 25, No. 4, Oct. 1995, pp. 14–26.

RFC 1189, "Internet Stream Protocol Version 2 (ST2) Protocol Specification", Delgrossi L. et al, Aug. 1995, pp. 28–45.

Forgie, J., 'ST–A Proposed Internet Stream Protocol', IEN 119, M.I.T. Lincoln Laboratory, Sep. 1979.

IP Header
- SENDING HOST ADDRESS
- DESTINATION ADDRESS (multicast)

SESSION

SENDER TEMPLATE

Traffic Specification
- PEAK RATE
- TOKEN BUCKET RATE
- TOKEN BUCKET DEPTH
- MIN POLICED UNIT | MAX DATAGRAM SIZE

PREVIOUS HOP

TIMESTAMP

Guaranteed Service Object (Optional)
- END-TO-END DELAY | QV | CRTs
- DESIRED DELAY BOUND | CSUM | DSUM
- ACCUMULATED DELAY BOUND | LV | DV

Fig. 2

IP Header
- RECIPIENT HOST ADDRESS
- UPSTREAM NODE ADDRESS

SESSION

DOWNSTREAM NODE

TIMESTAMP

TIMEDELTAPREV

WORST CASE DELAY

WORST CASE DTOT | WORST CASE CTOT

PATH MTU | CRTr

PATH BANDWITH

SENDER ADDRESS

Guaranteed Service Object
- EXCESS DELAY | BN

Fig. 3

| SESSION |  |
|---|---|
| DOWNSTREAM NODE | |
| DOWNSTREAM INTERFACE | |
| WORST CASE CTOT | WORST CASE DTOT |
| WORST CASE DELAY | |
| PATH BANDWIDTH | |
| PATH MTU | CRTr |
| DNEXT | BN |
| SENDER ADDRESS | |

Fig. 4

| SESSION | |
|---|---|
| DOWNSTREAM INTERFACE | |
| WORST CASE CTOT | WORST CASE DTOT |
| WORST CASE DELAY | |
| PATH BANDWIDTH | |
| PATH MTU | CRTr |
| DNEXT | BN |
| SENDER ADDRESS | |

Fig. 5

PACKET NETWORK

BACKGROUND OF THE INVENTION

The present invention relates to a method of reserving resources in a packet network. It has particular utility in relation to providing an internet offering Quality of Service guarantees.

Methods of reserving resources in an internet are well known. The method which is currently best supported in the Internet is that defined by the Resource Reservation Protocol (RSVP)

There is a desire to enable an internet to provide real-time communication as is, for example, required if telephone conversations or video-conferences are to be conducted over it. In this regard, two qualities of service that might be provided have been specified by the following documents (which are incorporated herein by reference):

(1) S. Schenker, C. Partridge, R. Guerin. Specification of Guaranteed Quality of Service, Request For Comments, September 1997, RFC 2212; and (2) J. Wroclawski. Specification of the Controlled-Load Network Element Service, Request For Comments, September 1997, RFC 2211.

Essentially, Guaranteed Service as defined in the first document allows a user to specify an upper bound on the time taken for his message to reach a recipient, whereas Controlled Load Service offers a service qualitatively similar to that provided by the internet when it is only lightly loaded. Operating an internet in accordance with the RSVP protocol allows the provision of real-time communication. The provision of such communication to the above-mentioned Quality of Service classes when operating an internet in accordance with the RSVP protocol is discussed in the following document (also incorporated herein by reference):

(3) P. White. RSVP and Integrated Services in the Internet: a tutorial, IEEE Communications magazine, May 1997.

In an internetwork operating in accordance with the RSVP protocol, a sender which wishes to increase the level of traffic it is sending to one or more receivers first sends out a path information packet which contains information concerning the characteristics of the path along which it has travelled and also information specifying the increased traffic level. This passes through each of the nodes through which the sender's increased traffic will pass in travelling to the one or more receivers. Path characteristic data is installed at those nodes as a result of the packet passing through them. Once this process is complete the one or more receivers calculate a required reservation on the basis of the increased traffic specification and end-to-end path characteristics (obtained from the received path information packet) and send a packet back towards the sender specifying the reservation required. Provided sufficient network resources are available each node receiving the reservation-requesting packet reserves appropriate resources and forwards the packet back towards the sender.

When an internet is operated in accordance with RSVP, receivers are responsible for requesting the reservation of resources. In contrast, in an internet operating in accordance with the Internet Stream Protocol Version 2 (ST2), senders are responsible for requesting reservation of resources.

Although a network operating in accordance with ST2 allows resources to be reserved more quickly than is possible with RSVP, it does not allow for different levels of service to be provided in relation to a single one-to-many or many-to-many communication.

SUMMARY OF THE INVENTION

According to the present invention there is provided a method of reserving resources in a packet network comprising a plurality of hosts and one or more interconnecting nodes, said method comprising the steps of:

operating a plurality of receiver hosts to send reverse-routed packets, containing one or more reservation influencing parameters, along a route via one or more of said interconnecting nodes to one or more sender hosts;

operating said one or more intermediate nodes to:
combine one or more parameters of received reverse-routed packets from different receivers to generate combined reservation influencing parameters;
store said combined parameters; and
send a reverse-routed packet containing said combined parameters further along said route towards said sender hosts;

operating said sender hosts to send a resource reservation packet to one or more receivers back along said route; and operating said one or more intermediate nodes, responsive to said reservation packet, to reserve resources in accordance with reservation influencing parameters stored at that node.

Because intermediate nodes examine reservation influencing data sent by receivers, and reserve resources accordingly, the present invention better tailors a resource reservation to receivers' requirements. Furthermore, the present invention achieves this without sacrificing the faster resource reservation associated with sender initiated resource reservation protocols.

Also, by combining path characteristic data in this way, the amount of path characteristic data sent between nodes in a network where a sender sends traffic to many receivers (i.e. where the sender is multicasting) is reduced.

In some embodiments, said one or more reservation influencing parameters include an indication of a desired quality of service class, and said one or more intermediate nodes are operable to:

update said parameters to represent the highest quality of service class requested by downstream receivers; and reserve resources in accordance with the resource reservation process associated with said highest quality of service class.

In this way, it is possible to support different quality of service classes within a single one-to-many or many-to-many communication. For example, some receivers might request a quality of service in accordance with the Guaranteed Service mentioned above, whereas others might only require a quality of service in accordance with the Controlled Load specification mentioned above. Thus, a more flexible set of services can be provided.

In some embodiments the reservation packet carries information indicating the nature of the traffic being output by the one or more senders, and node takes that information into account in calculating the resources to be reserved. In applications where the traffic from a sender is of a predetermined nature then this will not be essential.

In preferred embodiments, routing between the hosts is in accordance with a shared-tree protocol. In situations where there are a plurality of senders this reduces the amount of reservation influencing data that need be stored at a node.

This is especially advantageous in relation to communications involving a large number of senders. A large number of senders might exist in video or audio conferences involving many people. Even greater numbers of senders are possible in multi-player games or Distributed Interactive Simulations. These potentially involve many thousands of hosts both sending and receiving messages.

According to a second aspect of the present invention there is provided a packet network node comprising:

means for combining one or more parameters of received reverse-routed packets to generate combined reservation influencing parameters;

means for storing said combined parameters;

means for sending a reverse routed packet containing said combined parameters further along said route to said sender hosts; and means for reserving resources in accordance with combined reservation influencing parameters stored at that node responsive to a reservation packet.

By way of example, specific embodiments of the present invention will now be described with reference to the accompanying drawings.

BRIEF DESCRIPTION OF THE DRAWINGS

FIG. 2 is a schematic illustration of the contents of a reservation setting packet used in a first embodiment of the present invention;

FIG. 3 is a schematic illustration of the contents of an upstream-routed worst path characteristics per node packet used in the first embodiment;

FIG. 4 is a schematic illustration of worst path characteristics per path data stored in a node which operates in accordance with the first embodiment; and FIG. 5 is a schematic illustration of worst path characteristics per interface data stored in a node which operates in accordance with the first embodiment.

DETAILED DESCRIPTION OF A PREFERRED EMBODIMENTS

Figure 1:
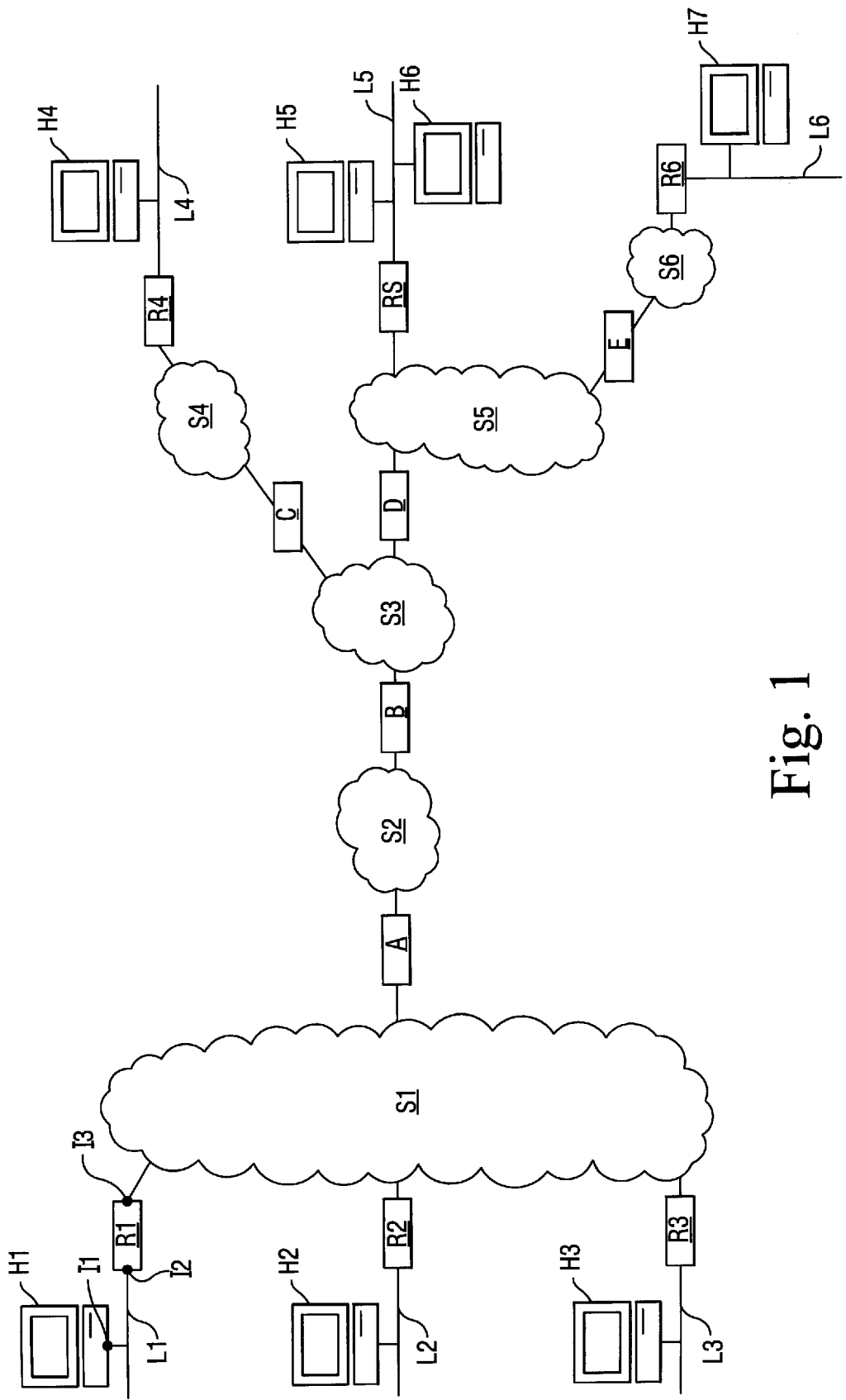
FIG. 1 is an illustration of a group of computers communicating with one another using an internet.

FIG. 1 shows seven computers (H1 to H7), each of which is connected to a Local Area Network (L1 to L6) which also includes a gateway router (R1 to R6). Two of the computers H5, H6 are connected to a single Local Area Network (LAN), the other five computers are connected to respective LANs. The gateway routers (R1 to R7) are interconnected by means of a network which comprises a number of subnets (S1 to S6) connected to one or more other subnets by intermediate routers (A to E).

A first subnet S1 connects three of the gateway routers (R1 to R3) to a first intermediate router A, which is in turn connected via a second subnet S2 to a second intermediate router B. A third subnet S3 connects the second intermediate router to third and fourth intermediate routers C,D. The third intermediate router C is connected via a fourth subnet S4 to the fourth gateway router R4. The fifth subnet S5 connects the fourth intermediate router D to both the fifth intermediate router E and the fifth gateway router R5. The fifth intermediate router E is connected to the sixth gateway router R6 via a sixth subnet S6.

The computers (H1 to H7), routers (R1 to R7, A to E) and subnets (S1 to S6) form a portion of an internet. The internet includes a number of other computers (not shown) connected to the LANs (L1 to L6) and might include further subnets, routers and LANs. The internet is operable to allow the computers (H1 to H7) to send messages to one another. It might, for example, be the network generally known as the Internet.

The internet operates in accordance with the TCP/IP network architecture. In addition, at least the routers and computers shown in FIG. 1 support multicasting.

Each of the seven computers (H1 to H7) is controlled by a program which allows its user to participate in a multi-player game. On a user acting to influence the game, a message representing his action is sent to each of the other computers. As will be appreciated by those skilled in the art, such a message will be routed in accordance with a multicasting protocol, with the seven computers forming a multicast group. The description below assumes that a source-based tree multicast routing protocol is used, but a shared-tree protocol such as the Core Based Tree (CBT) protocol might be used instead. Those skilled in the art will have little difficulty in adapting the embodiment to operate in accordance with a shared-tree multicasting protocol.

In accordance with Internet terminology, the computers are referred to below as hosts, and the word 'node' is intended to refer to both hosts and routers. Programs running on the computers are referred to as applications. Since more than one application requiring access to the internet may be executable by any given host, each application is assigned a 'port number' so that incoming messages labelled with a port number can be passed to the corresponding application.

As those skilled in the art will know, the TCP/IP protocol suite uses addresses which refer to interfaces rather than nodes. Hence the host H1 is identified by the IP address for the interface I1 and the router R1 has one IP address for the interface via which it connects to the LAN L1 and another address for the interface I3 by which it connects to the first subnet S1.

A message is said to travel downstream from a sending host to the other hosts in the multicast group. For this reason, when discussing the reserving of resources for a message from, say, first host H1 to the other hosts, the interface I1 between the first router R1 and the first LAN L1 is known as an upstream interface, and the interface I2 between the first router R1 and the first subnet S1 is known as a downstream interface.

Broadly, according to a first embodiment of the present invention, the portion of the internet serving the seven hosts (H1 to H7) is operable in accordance with the TCP/IP network architecture but is additionally operable in accordance with the following procedure to allow each of the hosts to reserve resources of the internet resources the characteristics of the communication paths to the other hosts can be controlled. For example, the delay in the communication can be minimised or reduced below a predetermined bound.

In the embodiment, each host occasionally sends a Reservation Packet (hereinafter an RES packet) to all the other hosts. Part of the purpose of this packet is to provide each node with the address of the downstream interface of the node directly upstream on the source-based tree which the message follows to each of the other hosts. This address is known as a previous hop address. Those skilled in the art will recognise that a similar function is performed by the PATH messages of the RSVP protocol.

Once a recipient host has received at least one RES packet, it will start sending Backwards Control packets (hereinafter BWDC packets) towards the sending host. Normally, the recipient host will send one such packet in a predetermined refresh period (though in certain circumstances (to be described below), it will send more than one).

Each of the nodes reads any BWDC packet it receives and stores worst path characteristic values included in the packet in its memory. The stored values are then used to update data representing the worst per interface path characteristics (stored data like this is known as a 'state' entry to those skilled in the art). A similar worst per interface state entry is made in relation to each of any other downstream interfaces of the node. The state entries are then compared and the worst per node path characteristics are obtained from the state entries and included in a BWDC packet to be sent upstream.

If the contents of a BWDC packet to be sent upstream differ from the contents of the previous BWDC packet sent from the node, then the BWDC packet is sent immediately. Otherwise the BWDC packet is sent at the expiry of the refresh period.

This procedure results in each of the nodes in the source-based tree storing a worst per interface state entry representing the worst of all the path characteristics from paths on the tree leading from the node to one or more of the recipient hosts.

On the basis of any RES packet which is subsequently received, each node calculates the reservation required on each downstream link of the tree, using the corresponding worst per interface state entry.

Any installed reservations or state entries in the node are implemented using so-called 'soft-state' as is used in RSVP. This means that the state entries will be deleted in the absence of appropiate refreshes known to those skilled in the art.

The reservation process will now be described in more detail in relation to FIGS. 2 to 5.

The RES packet sent from a sending host contains the information set out in FIG. 2. The packet is encapsulated in an IP datagram in a similar fashion to say, a RSVP control message, being identified as a datagram relating to the present reservation protocol by a next header field (not shown) in the IP header. Those skilled in the art will be familiar with other fields in the IP header not shown in FIG. 2.

The other fields in the RES packet contain the following information.

Session—this is identical to the session field defined by the RSVP protocol—it includes the destination address (a multicast address for the multicast group) for the flow (i.e. one or more messages) to which the RES packet relates and other parameters relating to the flow. The nature of these parameters is known to those skilled in the art Sender Template—this is identical to the corresponding field defined by the RSVP protocol—i.e. it is a filter specification identifying the sending host. It contains the IP address of the sending host and optionally the sending host port being used.

Traffic specification (Tspec) this is identical to the corresponding field defined by the RSVP protocol describing the sending host's traffic characteristics using the following token bucket representation.

p=peak rate of flow (bytes/second)
   b=bucket depth (bytes)
   r=token bucket rate (bytes/second)
   m=minimum policed unit (bytes)
   M=maximum datagram size (bytes)

Previous hop (Phop)—this is identical to the corresponding field defined by the RSVP protocol i.e. it is an object including the previous hop address.

Timestamp field—this is stamped with the time of the local node clock just before being forwarded to the next node(s) down the distribution tree.

End-to-end delay field—this gives the current delay from when a packet was transmitted by the sending host until it is due to arrive at the upstream interface of the next node.

CRTs field(2 bits)—this identifies the ceiling reservation type of the sending host application. 11 indicates guaranteed service, 10 indicates controlled-load, and 00 indicates best-effort. 01 is currently unspecified although may at some time be used for a new service with quality in between best-effort and controlled-load.

QoSvoid bit—if set to one this indicates that no quality of service guarantees can be offered.

If the sending host requires Guaranteed Service then the datagram further contains a Guaranteed Service Object which includes the following information. The values Csum and Dsum are as defined in the Guaranteed Service specification mentioned above.

CSum—accumulation of C values since last upstream reshaping point.

DSum—accumulation of D values since last upstream reshaping point.

Desired delay bound field which indicates the end-to-end delay bound desired by the sending host application.

Accumulated delay bound field which indicates the installed delay bound between sending host and the upstream interface of the next node.

Delayvoid bit (If set, this bit is an indication to any recipient host that the desired delay bound cannot be guaranteed).

Lossvoid bit (If set, this bit is an indication to the recipient host that a loss-free service cannot be guaranteed).

The BWDC packets transmitted by each node and the recipient hosts running under control of the application are illustrated in FIG. 3. Like the RES packets, the BWDC packets are encapsulated in an IP datagram. The destination IP address is in each case the previous hop address. Those skilled in the art will realise that, in that aspect, the BWDC packets are like the RESV packets of the RSVP protocol.

The other information contained in the BWDC packet includes:

Session—this is identical to the session field defined above for the corresponding RES packet.

Downstream hop object—this is identical to RSVP next hop object—i.e. it gives the address of the upstream interface of the node directly downstream that sent the packet.

Timestamp field which is stamped with the time of the local node clock just before being sent to the node directly upstream.

Timedeltaprev field—this is filled in with the stored value of timedeltaprev (whose value is explained below) just before being sent to the node directly upstream.

CRTr field(2 bits). This field indicates the recipient host application ceiling reservation type. The mapping between the values of this field and the reservation types they represent are the same as for the CRTs field in the RES message.

Worst Case Delay field. This equals the maximum data packet propagation delay measured between the upstream interface of the node from which the BWDC packet was sent and each recipient host downstream of that node.

Path MTU field. This equals the minimum pathMTU value between the upstream interface of the node from which the BWDC packet was sent and each recipient host downstream of that node.

Worst Case Ctot field—this is as defined in the Guaranteed Service specification—i.e. it equals the maximum accumulated Ctot value along the paths between the upstream interface of the node from which the BWDC packet was sent and each recipient host downstream of that node.

Worst Case Dtot—this is as defined in the Guaranteed Service specification—i.e. it equals the maximum accumulated Dtot value along the paths between the upstream interface of the node from which the BWDC packet was sent and each recipient host downstream of that node.

Path bandwidth This equals the maximum path bandwidth value along the paths between the upstream interface of the node from which the BWDC packet was sent and each recipient host downstream of that node.

Sender address—set to the address of the sending host—the address (in combination with the multicast address of the group of hosts H1 to H7) indicates to the node which source-based tree relates to the packet.

Ctot and Dtot are as defined in the Guaranteed Service specification. Where the sending host has requested Guaranteed Service the BWDC packet additionally includes the following:

Excess delay field—the amount by which the installed end-to-end delay bound currently exceeds the desired end-to-end delay bound.

Bottleneck flag—as explained below, if set to 1 this indicates that the BWDC message has travelled at least as far as the bottleneck router (i.e. the router where the accumulated-bound first exceeded the desired-bound on the first pass of the RES message)

On setting up the reservation initially, each host transmits an RES packet to the other hosts. Each node on the source-based tree made up by the paths from the sending host to the recipient hosts carries out the following timing operations. As explained below, each node carries out these operations each time a RES packet is received.

Firstly, the timestamp field is read and compared to the node's local clock to determine the time it has taken the RES packet to traverse the last hop. This duration is stored at the node as the parameter timedeltaprev. The timestamp is then set in accordance with the node's local clock and the RES packet is sent onwards to the next node(s) along the source-based tree towards the recipient hosts. This process is repeated until each of the nodes involved store a parameter (timedeltaprev) representing the propagation delay over the hop directly upstream of them (when traversed in the downstream direction).

Once the RES packets have propagated through the nodes of the source-based tree, each of the recipient hosts sends a BWDC packet towards the sending hosts. The initial values placed in the packet by the hosts are determined as follows. The path MTU, and path bandwidth correspond to the characteristics of the LAN to which the sending host is attached. The host inserts its IP address in the downstream node field and sets CRTr in accordance with the quality of service it requires. The worst case path characteristics are all set to zero, as is the bottleneck flag. The excess delay field is unused at this stage. The timedeltaprev parameter is assigned to the timedeltaprev field.

On receipt of a BWDC packet a node carries out timing operations and worst per node path characteristic determining operations as described below.

The timing operations involve the node first reading the timedeltaprev field in the packet. It will be realised that this records the propagation delay (experienced by the RES packet) over the hop downstream from the node (when traversed in the downstream direction). By also reading the timestamp field of the BWDC packet and the local clock a value for the propagation delay over the same hop in the other direction is obtained. It is assumed that the delay over the downstream hop is the same in either direction. Hence, by taking the average of these two delays a value of the propagation delay independent of any discrepancy between the node clocks is obtained. This average delay for the downstream hop is stored by the node as a parameter 'dnext'.

The path characteristic monitoring operations are as follows.

Upon arrival of an BWDC packet, the node first checks for the existence of a worst per path state entry relating to the current session and to the downstream path identified by two path identifying parameters, namely the downstream node field of the packet, and the address of the downstream interface on which the BWDC message arrived.

If no previously stored worst per path state entry is found that relates to the path and session, then a new worst per path state entry is created.

The format of a worst per path state entry is as shown in FIG. 4 and includes a session identifying field, and a sender address field, the two path identifying fields and additionally the following fields:

Worst Case Ctot

Worst Case Dtot

Worst Case Delay path bandwidth

CRTr pathMTU dnext bottleneck flag

The new worst per path state entry is created by assigning the CRTr, path bandwidth, pathMTU, Worst Case Delay, Worst Case Ctot and Worst Case Dtot values contained in the BWDC packet to the corresponding fields of the worst per path state entry. The parameter dnext calculated in the timing operation is assigned to the dnext field. The bottleneck flag is initialised to zero and is used as explained below.

If the node has a plurality of worst per path state entries on the same interface and relate to the same session, then it combines them to create a worst per interface state entry. This situation might arise where the downstream interface connects to a shared medium LAN.

As shown in FIG. 5, the worst per interface state entry contains the same fields as the worst per path state entry save that it lacks the downstream node field. The values assigned to the session, sender address field and downstream interface fields are those of the worst per path state entries. The values for the other fields are calculated as follows.

Worst Case Ctot=MAX{Worst Case $Ctot_i$}

Worst Case Dtot=MAX{Worst Case $Dtot_i$}

Worst Case Delay=MAX{Worst Case $Delay_i$} path bandwidth=MAX{path $bandwidth_i$} pathMTU=MIN{$pathMTU_i$}

CRTr=MAX{$CRT_i$} dnext=MAX{$dnext_i$} where the subscript i takes values from 1 to the number of nodes sharing the downstream interface. It will be seen that the values Worst Case Ctot, Worst Case Dtot and Worst Case Delay that are stored in the worst per interface state entry are worst case path characteristic values for the downstream interface. It is possible that the values relate to different paths from the interface. The bottleneck flag is set to one if any of the per path state entries have it set to one.

Having created a worst per interface state entry for each of its downstream interfaces, the node then generates a BWDC packet containing worst per node data at least once every refresh period. The parameters to be included in the worst per node data are calculated as follows Worst Case Ctot=MAX{Worst Case Ctot$_n$+Clocal$_n$} where Clocal$_n$ is the value of Ctot between the downstream interface on which the BWDC packet arrived and the upstream interface (determined by the session) of the node;

Worst Case Dtot=MAX{Worst Case Dtot$_n$+Dlocal$_n$} where Dlocal$_n$ is the value of Ctot between the downstream interface on which the BWDC packet arrived and the upstream interface (determined by the session) of the node;

Worst Case Delay=MAX{Worst Case Delay$_n$}+dnext$_n$ path bandwidth=MIN(MAX{path bandwidth$_n$}, path bandwidth upstream)

CRTr=MAX{CRTr$_n$} pathMTU=MIN(MIN{pathMTU$_n$}, pathMTU upstream) where n is an index which takes values from one to the number of downstream interfaces from the node and 'pathMTU upstream' and 'path bandwidth upstream' represent the minumum packet size and the bandwidth of the upstream hop respectively.

If CRTr is not set to 11 then Ctot, Dtot and Worst Case Delay are set to zero.

The above operations are repeated by each node in the source-based tree relating to the current session. It will be realised that for a flow from a given sending host, each node stores the worst case characteristics of all the paths leading from the node to the recipient hosts.

The sending host then sends a further RES packet (FIG. 2) requesting, for example, Guaranteed Service. Hence, the CRTs field in the packet is set to 11 and the desired delay bound is set to the limit that the receiver wishes to be placed on the time taken for a packet from the sending host to reach all the recipient hosts.

The Traffic Specification fields are filled in by the sending host, and the end-to-end delay field is set to the value of the parameter dnext stored at the sending host. Each of the fields of the Guaranteed Service other than the desired delay bound is initialised to zero.

At the first node downstream along the source-based tree, the queuing delay to be imposed on the flow in relation to each of the one or more downstream hops involved in the current session. This is determined in accordance with the equation below:

$$Qdelay = desired\text{-}bound - accumulated\text{-}bound - Worst\ Case\ Delay \quad \text{Equation (1)}$$

The Worst Case Delay value equals the sum of the corresponding field and the dnext parameter of the worst per interface state entry at the current node. At the first node the accumulated bound will normally be zero or negligible. The Qdelay value represents an estimate of the total queuing delay that can be tolerated over the remainder of the path to a recipient host.

Processing similar to that carried out by receivers operating in accordance with the RSVP protocol is then used to calculate a bandwidth to be reserved on each of the downstream hops in order to stay 'on-course' for the desired bound. This calculation will often be an overestimate because it may be that the individual worst per interface parameters relate to different paths from that interface. Those skilled in the art will realise that the estimate is calculated using the following equations:

$$Qdelay_{end2end} = \frac{(b-M)(p-R)}{R(p-r)} + \frac{(M+Ctot)}{R} + Dtot \quad (\text{case } p > R >= r) \quad \text{Equation 2}$$

$$Qdelay_{end2end} = \frac{(M+Ctot)}{R} + Dtot \quad (\text{case } R >= p >= r) \quad \text{Equation 3}$$

The parameters M, p, b and r are obtained from the corresponding fields of the RES message (the meaning of those symbols is as set out above in relation to the RES message). The values of Ctot and Dtot are a sum of the values from the worst per interface state entry relating to the current downstream interface and the local values of C and D. To obtain the value of Qdelay to insert into the equations 2 and 3, equation 1 is used. The equation is solved to yield a value for R and a bandwidth R is reserved over the hop leading from the current downstream interface.

In accordance with the rules set out in the Guaranteed Service specification, the values of CSum and DSum are used along with other parameters to calculate the amount of buffering that must be assigned to the reservation to prevent packet loss.

Once the reservation request has been serviced the end-to-end delay field in the RES packet is increased by adding to it the following:

The propagation delay, dnext for the next hop

An estimate of the current local queuing delay(for the relevant outgoing interface) for data packets of the flow to which the RES packet refers.

The following updates are also made to the RES packet:

The accumulated-bound field of the copied packet is increased by:

1) The propagation delay, dnext for the next hop, and
2) The installed local queuing delay bound (for the relevant downstream interface) for messages of the flow to which the RES packet refers. This local queuing delay bound is obtained by inserting the reserved value of R into Equation 2and Equation 3along with the local values C and D for the parameters Ctot and Dtot respectively.

The following updates are then made to the RES packet the local value of C is added to the CSum field the local value of D is added to the DSum field unless re-shaping of the sending hosts traffic is carried out at the downstream interface, in which case both CSum and Dsum are set to zero.

Also, the Qosvoid field is set to one if either a) a Guaranteed Service reservation attempt fails to reserve a bandwidth at least as great as the token bucket rate of the traffic specification; or b) a Controlled Load reservation attempt fails.

If a node receives a RES packet with Qosvoid set to one, then if MIN{CRTs,CRTr}is 10 or 11 it attempts to secure a Controlled Load reservation.

Once updating of the fields is complete the timestamp field is (as described above) set equal to the local clock before forwarding the RES packet to each next hop down the routing tree.

Similar processing is carried out at each of the subsequent nodes, the increase of the accumulated bound by the installed queuing delay resulting in the value of Qdelay obtained from equation (1) continuing to be an estimate of the total queuing delay that can be tolerated for the remainder of the path to a recipient host. Assuming the messages from the host to be in accordance with the declared traffic specification, and provided each of the nodes is able to reserve the calculated bandwidth R, the above-described processing at the nodes will be effective to enable messages from the sending hosts to be delivered within the desired delay bound to all of the recipient hosts.

If any node is unable to reserve the bandwidth as calculated above then (subject to policy configurations at the node) as much bandwidth as possible is reserved. If, however, the amount of bandwidth reserved is less than the value of the token bucket rate field of the RES packet then Guaranteed Service is not offered and this is indicated by setting the delayvoid, lossvoid and Qosvoid flags to 1.

If the bandwidth reserved is more than the value of the token bucket rate field of the RES packet, then the accumulated bound is compared to the desired bound.

Where the desired bound is higher then the reservation process continues as above. Since the reserved bandwidth R may be overestimated as explained above, this often results in the setting up of reservations which provide a delay over the end-to-end path which is less than the desired delay bound.

Where, however, the desired bound is lower, the node
  sets a reservation bottleneck flag associated with the relevant per interface state entry, thereby labelling itself as a bottleneck node.
  sets the delayvoid flag in the RES packet to one and forwards it to nodes further down the tree.

Where a node receives an RES packet with the delayvoid field set to one, it reserves the maximum bandwidth possible (perhaps limited to a multiple of the peak rate of the sending host) and forwards it on.

On receiving an RES packet with delayvoid field set to 1 and delayloss field set to 0(for CRTs=CRTr=11) the recipient host calculates the amount by which the accumulated delay bound field exceeds the desired delay bound field. The recipient host then immediately sends a BWDC packet with the excess delay field set to the calculated excess delay and with the bottleneck field set to zero. Each node receiving such an BWDC packet ignores the packet unless the bottleneck flag of the node's associated worst per interface state entry is set to 1. The bottleneck node receives the BWDC packet and sets the bottleneck field to one. The node attempts to eliminate or reduce the excess delay indicated in the BWDC message by increasing the local bandwidth reservation. Following this if excess delay still exists the BWDC packet with the modified value of excess delay is then sent a hop at a time towards the sender with a reservation increase being attempted at each node until either the BWDC packet reaches the sender or the excess delay is eliminated.

In the above embodiment, data is combined at a node and sent to a node upstream where that combined data is used to calculate an appropiate resource reservation.

In other embodiments the resource reservation might be calculated on the basis of combined data at the node where the combination takes place.

A second embodiment is similar to the first embodiment but uses a shared tree protocol. In the second embodiment the sender address field (in the BWDC packet, the worst per path and worst per interface state entries) is not required. This is because the interfaces out of which the RES packet are to be sent are determinable by the node on the basis of the session parameter and the incoming interface. Since, when using a shared tree the worst per interface state entries will relate to the multicast group rather than a specific sender to the multicast group, the number of worst per interface state entries in each node is only as great as the number of outgoing interfaces from the node.

It will be seen how, in multi-sender environments, the second embodiment reduces the amount of worst per interface state entries required in comparison with known reservation protocols.

In the above embodiments, the worst-case merging of C terms (e.g. Ctot), D terms (e.g. Dtot) and link propagation delay was carried out for each term independently. This results in an overly conservative local bandwidth reservation. In preferred embodiments, a rate independent delay parameter which includes both the D term and the link propagation delay is used. This might be done by taking the forwarded value of D as the value from the worst case rate independent delay parameter rather than simply the maximum D value from each path.

It will be seen how the above embodiments enable a router to find the highest quality of service requested by any one of the downstream receivers. Similar considerations apply to path characteristic data and other reservation influencing parameters. It is the combination of such parameters at intermediate nodes in the network that allows a more flexible resource reservation to be provided for multicast communication in a packet network.

What is claimed is:

1. A method of reserving resources in a packet network comprising a plurality of hosts and one or more interconnecting nodes, said method comprising the steps of:
  operating a plurality of receiver hosts to send reverse-routed packets, containing one or more reservation influencing parameters, along a route via one or more of said interconnecting nodes to one or more sender hosts;
  operating said one or more intermediate nodes to:
    combine one or more parameters of received reverse-routed packets from different receivers to generate combined reservation influencing parameters;
    store said combined parameters; and
    send a reverse-routed packet containing said combined parameters further along said route towards said sender hosts;
  operating said sender hosts to send a resource reservation packet to one or more receivers back along said route; and
  operating said one or more intermediate nodes, responsive to said reservation packet, to reserve resources in accordance with reservation influencing parameters stored at that node.

2. A method according to claim 1 wherein:
  said one or more reservation influencing parameters include an indication of a desired quality of service class;
  said one or more intermediate nodes are operable to:
    update said parameters to represent the highest quality of service class requested by downstream receivers; and
    reserve resources in accordance with the resource reservation process associated with said highest quality of service class.

3. A method according to claim 1 wherein said one or more reservation influencing parameters include path characteristic parameters.

4. A method according to claim 3 wherein said path characteristic parameters comprise one or more delay parameters.

5. A method according to claim 1 wherein said hosts communicate in accordance with a shared tree routing algorithm.

6. A packet network node comprising:

means for combining one or more parameters of received reverse-routed packets to generate combined reservation influencing parameters;

means for storing said combined parameters;

means for sending a reverse routed packet containing said combined parameters further along said route to said sender hosts; and means for reserving resources in accordance with combined reservation influencing parameters stored at that node responsive to a reservation packet.

7. A method of reserving resources in a packet network comprising a plurality of hosts and one or more interconnecting nodes, said method comprising the steps of:

operating one or more receiver hosts to send path characteristic data packets, containing one or more path parameters, along a route via one or more of said interconnecting nodes to one or more sender hosts;

operating said one or more intermediate nodes to:

process one or more parameters of received path characteristic data packets to generate updated path characteristic parameters;

store said updated parameters; and send a path characteristic data packet containing said updated parameters further along said route to said sender hosts operating said sender hosts to send a resource reservation packet to one or more receivers back along said route; and operating said one or more intermediate nodes, responsive to said reservation packet, to reserve resources in accordance with path characteristic data stored at that node.

* * * * *